A. L. POWELL.
TRANSMISSION FOR ENGINES.
APPLICATION FILED DEC. 8, 1920.

1,384,336.

Patented July 12, 1921.

Inventor
Alvah L. Powell

UNITED STATES PATENT OFFICE.

ALVAH L. POWELL, OF MILES CITY, MONTANA, ASSIGNOR TO THE A. L. POWELL POWER CO., OF MILES CITY, MONTANA, A CORPORATION.

TRANSMISSION FOR ENGINES.

1,384,336.      Specification of Letters Patent.      Patented July 12, 1921.

Application filed December 8, 1920. Serial No. 429,170.

*To all whom it may concern:*

Be it known that I, ALVAH L. POWELL, citizen of the United States, residing at Miles City, in the county of Custer and State of Montana, have invented certain new and useful Improvements in Transmission for Engines, of which the following is a specification.

My invention relates to improvements in the transmitting member of engines by which I secure a variation in the movement of the piston with reference to that of the crank, enabling me to gain advantages in the operation of such engines that are impossible with the constructions at present used. This application is an improvement over the form shown in my other application, Serial Number 429,168, made simultaneously with this, but while the general principles are the same, I derive advantages from the use of the improvement herein described that are not covered in my prior application. My specific improvement is the use of a pinion and rack on which the teeth are cut on a pitch curve partially or continuously spiral, by which means I am able to distribute the force of the cylinder pressure on the crank circle more evenly, with reference to the mechanical effect.

In all engines that derive power from a pressure source, transmitted by a reciprocating motion to a crank following a circular path, there is an inherent variation of movement of crank and reciprocating means that gives a varying pressure on the crank circle. This is due to the angularity of the connecting rod, which is an essential element in such structures. By the means I employ I not only apply my power to the crank in a way that compensates for crank pressure variation, but also secure a more uniform effect from the expansion of gases in the engine cylinder. For, as the engine pressure falls toward the end of stroke, the leverage between transmitting members and crank rises, the crank pressure remaining approximately constant throughout the power stroke. It is evident, of course, that the speed of the crank will decrease as the spiral pinion increases the leverage of the applied pressure, but in such an engine the average torque during a revolution will be more uniformly distributed.

Figure 1:
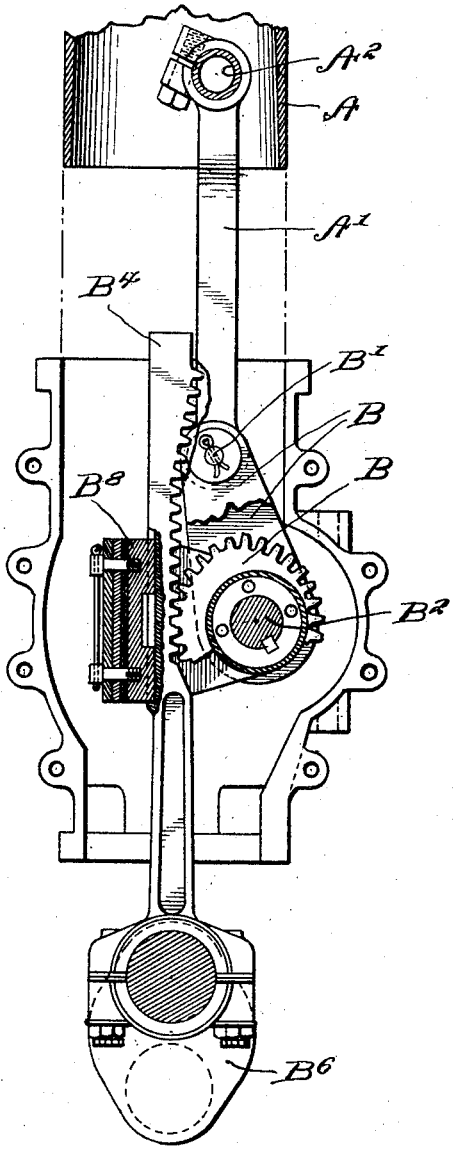

In the annexed drawings I show an application of my invention, in which Figure 1 is an elevation, partly in section, of my spiral pinion and rack applied to an engine, in this case the latter being assumed to be of the explosion type.

Figure 2:
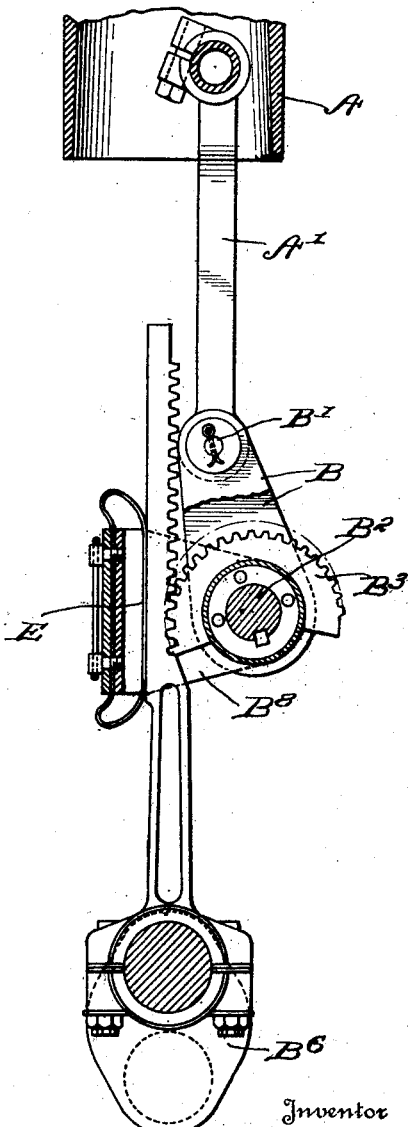

Fig. 2 shows a modification of the spiral, illustrating that the leverage pressure may be adapted to concentrate on any points of the crank circle.

In Fig. 1 the transmitting members are substantially the same as shown in my previous application, as hereinbefore stated. The toothed connecting rod slides in a supporting means, $B^8$, pivoted loosely on the pin $B^2$ and engages a segmental pinion, $B^3$, keyed to said pin. The force of piston expansion is transmitted to a crank, B, by a piston rod link, $A^1$, this link being held to the crank B by a pin, $B^1$. The radius of the pin $B^1$ from the center of pin $B^2$ is greater than the radius of the pitch curve of the segmental rack, thus causing a difference in the movement of the piston A with reference to that of the shaft crank $B^6$. On the explosion, or combustion, of gases in the cylinder, the piston A advances, forcing the lever crank B downward. As B is keyed to the pin $B^2$ this causes the segmental rack $B^3$ to make a partial revolution. At the first part of stroke, while the gases are at maximum temperature and pressure, the radius of the pitch curve of the pinion is approximately uniform but, as temperature and pressure decline with the advance of the piston, the spiral becomes more defined, causing an increase of leverage from the pinion that compensates for falling pressure. The movement of the crank is shortened as the leverage increases. To insure proper mating of the crank rod rack with the spiral pinion, the form of said rack is made to conform to the variation of pitch curve of pinion, as shown in Fig. 1.

In Fig. 2 I show a construction by which I am able to retain the form of the toothed piston rod as a straight rack. In this, I insure uniform contact by means of the spring E which maintains pressure against the toothed crank rod, forcing it into constant contact with the segmental spiral pinion. As the shape of the pinion may be varied to suit any conditions of movement and pressure, I show, in Fig. 2, a pitch curve on a pinion that gives maximum leverage effect at a point differing from that illustrated in Fig. 1.

It is evident that many modifications may be made in the form and application of my invention. The pitch curve of pinion and rack may be variously altered, and the principle may be applied to any engine operated by pressure. I do not wish to be limited to the exact construction herein described.

What I claim as new, and ask to have protected by Letters Patent, is—

1. In an engine, the combination of a piston, a link from said piston, a supporting pin, a lever on said pin, means connecting said lever with said link, a segmental pinion having a pitch curve of varying distance from the axis of rotation mounted on said pin and rotatable with said lever, a toothed connecting rod the teeth of which engage the teeth of said segmental pinion, means by which the pitch line of the teeth of said toothed connecting rod will vary with the variations of the pitch line of the teeth of the meshing segmental pinion, a pivoted oscillating member whereby the teeth of the said toothed connecting rod will maintain engagement between the said meshing members, a crank, means for connecting said rod with said crank, and a shaft to which said crank is connected, substantially as described.

2. In an engine, a reciprocating power means, a rotary power delivery means and an intermediate connecting means, a connecting rod, a piston, a segmental pinion having a pitch curve of varying distance from center of its axis of rotation, a rack having a variable pitch, and means whereby the movement of said connecting rod with reference to that of said piston is varied by the said segmental pinion meshing with the said variable pitch rack, substantially as described.

3. In a transmission member, a segmental pinion having teeth cut on a pitch curve of varying distance from center of its axis of rotation, a rack engaging said segmental pinion, the teeth of said rack being cut on a pitch line varying to conform to the variations of the pitch radius of said segmental pinion, means for actuating the segmental pinion from a power source, a crank, a shaft operative by said crank, and means for rotating said crank by the action of the toothed connecting rod, substantially as described.

4. In an engine, a reciprocating power means, a rotary power delivery means, a connecting rod, a piston, and an intermediate connecting means whereby the movement of said connecting rod with reference to the movement of said piston is varied by a segmental pinion having a pitch curve of varying distance from center of its axis of rotation meshing with a toothed connecting rod, and means for holding said meshing members in engagement, substantially as described.

In testimony whereof I affix my signature.

ALVAH L. POWELL,